United States Patent
Jou

(10) Patent No.: US 10,484,710 B2
(45) Date of Patent: Nov. 19, 2019

(54) VIDEO ENCODING APPARATUS AND METHOD

(71) Applicant: Novatek Microelectronics Corp., Hsinchu (TW)

(72) Inventor: Fan-Di Jou, Hsinchu County (TW)

(73) Assignee: Novatek Microelectronics Corp., Hsinchu (TW)

(*) Notice: Subject to any disclaimer, the term of this patent is extended or adjusted under 35 U.S.C. 154(b) by 0 days.

(21) Appl. No.: 15/927,113

(22) Filed: Mar. 21, 2018

(65) Prior Publication Data

US 2019/0297345 A1 Sep. 26, 2019

(51) Int. Cl.
*H04N 19/573* (2014.01)
*H04N 19/147* (2014.01)
*H04N 19/172* (2014.01)
*H04N 19/159* (2014.01)

(52) U.S. Cl.
CPC ......... *H04N 19/573* (2014.11); *H04N 19/147* (2014.11); *H04N 19/159* (2014.11); *H04N 19/172* (2014.11)

(58) Field of Classification Search
CPC ... H04N 19/147; H04N 19/159; H04N 19/172
See application file for complete search history.

(56) References Cited

U.S. PATENT DOCUMENTS

| 2008/0069202 A1* | 3/2008 | Baillavoine | H04N 19/105 375/240.01 |
| 2009/0033745 A1* | 2/2009 | Yeredor | G01S 3/7864 348/152 |
| 2013/0058405 A1* | 3/2013 | Zhao | H04N 19/176 375/240.12 |

(Continued)

FOREIGN PATENT DOCUMENTS

| CN | 105872556 | 8/2016 |
| CN | 106162194 | 11/2016 |

(Continued)

OTHER PUBLICATIONS

Petterson et al., "Dependent random access point pictures in HEVC," 2015 IEEE International Conference on Image Processing (ICIP), Sep. 27-30, 2015, pp. 1-5.

(Continued)

*Primary Examiner* — Tracy Y. Li
(74) *Attorney, Agent, or Firm* — JCIPRNET

(57) ABSTRACT

A video encoding apparatus and method are provided. The video encoding apparatus includes a video encoding circuit and a control circuit. The video encoding circuit performs a video encoding operation on a video stream to produce an encoded stream. The control circuit controls the video coding circuit to perform the video encoding operation. The control circuit dynamically sets a current frame in the video stream to at least one of a long-term reference frame, a short-term reference frame, and a non-reference frame according to at least one of a playback latency control condition and an inter-frame correlation condition. The long-term reference frame and the short-term reference frame are used as the decoding reference frame in a video decoding operation.

14 Claims, 4 Drawing Sheets

(56) References Cited

U.S. PATENT DOCUMENTS

2016/0191931 A1* 6/2016 Hannuksela ......... H04N 19/105
375/240.12

FOREIGN PATENT DOCUMENTS

CN 106791870 5/2017
CN 106791875 5/2017

OTHER PUBLICATIONS

Sjöberg et al., "JCTVC-S0095: HLS: Dependent RAP Indication SEI Message," Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-19.
International Telecommunication Union, "High efficiency video coding, Series H: Audiovisual and Multimedia Systems, Infrastructure of audiovisual services—Coding of moving video," Recommendation ITU-T H.265, Apr. 2013, pp. 1-317.
Joint Video Team (JVT) of ISO/IEC MPEG & ITU-T VCEG, "Text of ISO/IEC 14496 10 Advanced Video Coding 3rd Edition," ISO/IEC JTC 1/SC 29/WG 11 N6540, Jul. 2004, pp. 1-330.

* cited by examiner

VIDEO ENCODING APPARATUS AND METHOD

BACKGROUND

Field of the Invention

The invention relates to a video apparatus and more particularly, to a video encoding apparatus and a video encoding method.

Description of Related Art

A smart encoding technique is usually applied to IP camera products. The smart encoding technique can achieve further reducing a bit rate for encoding with an IP camera mainly through controlling a rate distribution of an encoder and a group of pictures (GOP) structure. In the IP camera, the GOP structure generally encodes one I frame and 49 P frames per 2 seconds. The I frame and the P frames are encoded by using the conventional technique and thus, will not be repeated. The I frame has a higher bit rate, but has an advantage of randomly access (or playback). Each of the P frames is encoded/decoded by referring to a former frame on a timeline. Thus, to randomly access a certain current P frame, the decoding operation has to start from the closest I frame and decode the frames one by one until the current P frame. As one can imagine, it may spend notable cost on decoding latency to complete the decoding of the current P frame.

In order to reduce the decoding latency during the random access (or playback) process, a key P frame (KP frame) structure is provided in the conventional technique. A reference frame of the KP frame is an I frame (or a KP frame), and a process of encoding/decoding the KP frame is similar to that of the P frame. Thus, the KP frame has a lower bit rate (in comparison with the I frame). The encoding manner of the KP frame is not limited herein. For example, the KP frame may be encoded by using the conventional technique or other encoding manners and thus, will not be repeated. Generally, one I frame is encoded per 8 to 12 seconds, one KP frame is encoded per 2 seconds between two adjacent I frames, and 49 P frames are encoded between two adjacent KP frames. Being similar to the I frame, the KP frame may also be indexed. Thus, during the random access process, one more decoding latency of one frame appears, and the KP frame may be used in replacement with the I frame. In the conventional technique, a certain current KP frame and its closest I frame are fixedly set to a long term reference (LTR) frame, so as to be provided to the current KP frame for reference. In addition, in the conventional technique, a certain current P frame and its closest KP frame and/or former P frame are fixedly (uniquely) set to a short term reference (STR) frame, so as to be provided to the current P frame for reference. In any way, the KP frame and/or the P frame are fixedly (uniquely) set to the STR frame in the conventional technique, and thus, encoding efficiency cannot be optimized. Moreover, the conventional technique can only ensure the playback latency of the KP frames, but cannot control the playback latency for the P frames.

SUMMARY

The invention provides a video encoding apparatus and a video encoding method capable of setting a current frame to a long term reference (LTR) frame, a short term reference (STR) frame and/or a non-reference (NR) frame according to a playback latency control condition and/or an inter-frame correlation condition during a video encoding operation.

According to an embodiment of the invention, a video encoding apparatus is provided. The video encoding apparatus includes a video encoding circuit and a control circuit. The video encoding circuit performs a video encoding operation on a video stream to generate an encoded stream. The control circuit controls the video encoding circuit to perform the video encoding operation. According to at least one of a playback latency control condition and an inter-frame correlation condition, the control circuit dynamically sets a current frame in the video stream to at least one of a LTR frame, a STR frame and a NR frame. The LTR frame and the STR frame are used as a decoding reference frame in a video decoding operation.

According to an embodiment of the invention, a video encoding method is provided. The video encoding method includes: performing, by a video encoding circuit, a video encoding operation on a video stream to generate an encoded stream; controlling, by a control circuit, the video encoding circuit to perform the video encoding operation; and dynamically setting, by the control circuit, a current frame in the video stream to at least one of a LTR frame, a STR frame and a NR frame according to at least one of a playback latency control condition and an inter-frame correlation condition, wherein the LTR frame and the STR frame area used as a decoding reference frame in a video decoding operation.

Based on the above, during the process of the video encoding operation, the video encoding apparatus and the video encoding method provided by the embodiments of the invention can achieve dynamically setting the current frame to the LTR frame, the STR frame and/or the NR frame according to the playback latency control condition and/or inter-frame correlation condition. Thus, the video encoding apparatus and the video encoding method provided by the embodiments of the invention can further achieve optimization of encoding efficiency.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
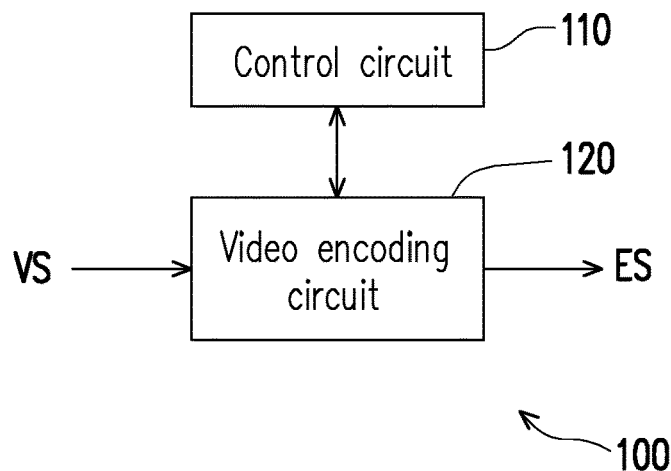
FIG. 1 is a schematic circuit block diagram illustrating a video encoding apparatus according to an embodiment of the invention.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. Moreover, wherever possible, components/members/steps using the same referral numerals in the drawings and description refer to the same or like parts. Components/members/steps using the same referral numerals or using the same terms in different embodiments may cross-refer related descriptions.

FIG. 1 is a schematic circuit block diagram illustrating a video encoding apparatus 100 according to an embodiment of the invention. The video encoding apparatus 100 includes a control circuit 110 and a video encoding circuit 120. The video encoding circuit 120 performs a video encoding operation on a video stream VS to generate an encoded stream ES. The control circuit 110 is coupled to the video encoding circuit 120. The control circuit 110 controls the video encoding circuit 120 to perform the video encoding operation. The implementation detail related to the encoding manner of the video encoding operation is not limited in the present embodiment. For instance, the video encoding operation may include a conventional encoding technique or other encoding manners.

Figure 2:
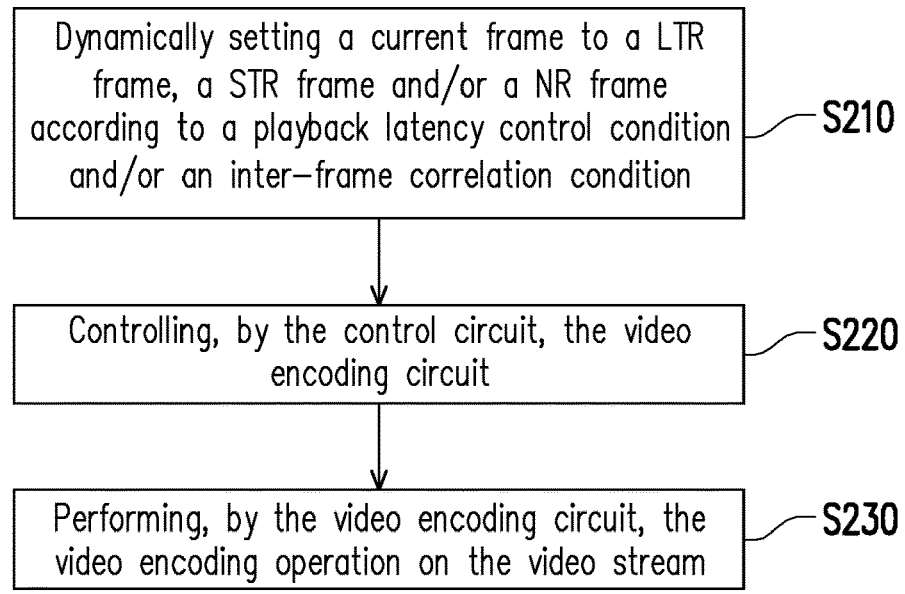
FIG. 2 is a flowchart illustrating a video encoding method according to an embodiment of the invention.

FIG. 2 is a flowchart illustrating a video encoding method according to an embodiment of the invention. Referring to FIG. 1 and FIG. 2, in step S210, the control circuit 110 may dynamically check whether a playback latency control condition and/or an inter-frame correlation condition are satisfied. The playback latency control condition refers to whether a playback latency of a reference frame of a current frame is acceptable, i.e., whether the playback latency of the reference frame is less than a latency threshold. The latency threshold may be determined based on design requirements. The inter-frame correlation condition refers to whether correlation between the current frame and its reference frame is acceptable. For instance, the inter-frame correlation condition includes whether the current frame is similar to its reference frame.

According to the playback latency control condition and/or the inter-frame correlation condition, the control circuit 110, in step S210, dynamically sets a current frame in the video stream VS to a long term reference (LTR) frame, a short term reference (STR) frame and/or a non-reference (NR) frame. The LTR frame and the STR frame may be used as a decoding reference frame in a video decoding operation. The LTR frame may be used as a reference frame of a key P frame (KP frame). The STR frame may be used as a decoding reference frame of a P frame.

According to settings of the LTR frame, the STR frame and the NR frame and other encoding parameter settings, the control circuit 110, in step S220, may control the video encoding circuit 120 to perform the video encoding operation. Based on the control in step S220, the video encoding circuit 120, in step S230, may perform the video encoding operation on the video stream VS to generate the encoded stream ES.

Figure 3:
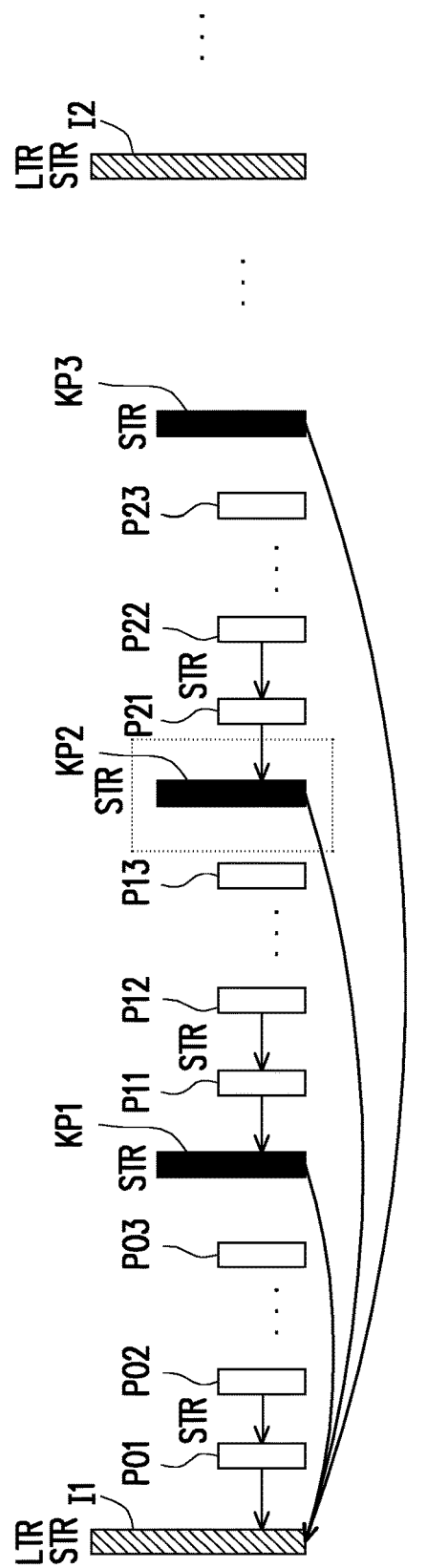
FIG. 3 is a schematic diagram illustrating different video frames according to an embodiment of the invention.

FIG. 3 is a schematic diagram illustrating different video frames according to an embodiment of the invention. In the embodiment illustrated in FIG. 3, the horizontal axis represents the time, and the vertical axis represents a bit rate (or data amount). A plurality of frames of the video stream VS are respectively encoded into I frames, KP frames and P frames. For example, in the embodiment illustrated in FIG. 3, based on the control in step S220, the video encoding circuit 120 may encode a frame I1 and a frame I2 in the video stream VS into the I frames, encode a frame KP1, a frame KP2 and a frame KP3 in the video stream VS into the KP frames and encode a frame P01, a frame P02, a frame P03, a frame P11, a frame P12, a frame P13, a frame P21, a frame P22 and a frame P23 in the video stream VS into the P frames.

In the embodiment illustrated in FIG. 3, each of the frame I1, the frame KP1, the frame KP2 and the frame KP3 is set to a STR frame, so as to serve as a reference frame of the P frames between two adjacent KP frames (or between adjacent I frame and KP frame). For instance, the frame I1 set to the STR frame may serve as the reference frame of the frame P01, and the frame KP1 set to the STR frame may serve as the reference frame of the frame P11. In addition, each of the P frames may be set to a STR frame, so as to serve as a reference frame of a subsequent P frame. For instance, the frame P01 set to the STR frame may serve as the reference frame of the frame P02, and the frame P11 set to the STR frame may serve as the reference frame of the frame P12.

In the embodiment illustrated in FIG. 3, each of the frame I1 and the frame I2 are also set to a LTR frame, so as to serve as a reference frame of the KP frames between two adjacent I frames. For instance, the frame I1 set to the LTR frame may serve as the reference frame of the frame KP1, the frame KP2 and the frame KP3. Thus, to randomly access the frame KP2 illustrated in FIG. 3, the closest I frame (i.e., the frame I1) is first decoded, and then the frame KP2 is allowed to be decoded (because the reference frame I1 is required). A playback latency (decoding latency) of the frame KP2 illustrated in FIG. 3 is a time for decoding two frames. However, a distance between the frame KP2 and its reference frame (i.e., the frame I1) is long. As the distance between two frames is increased, it usually indicates that a similarity between the two frames is reduced. As the similarity is reduced, a bit rate resulted from the similarity is increased (i.e., a compression rate is poorer).

Figure 4:
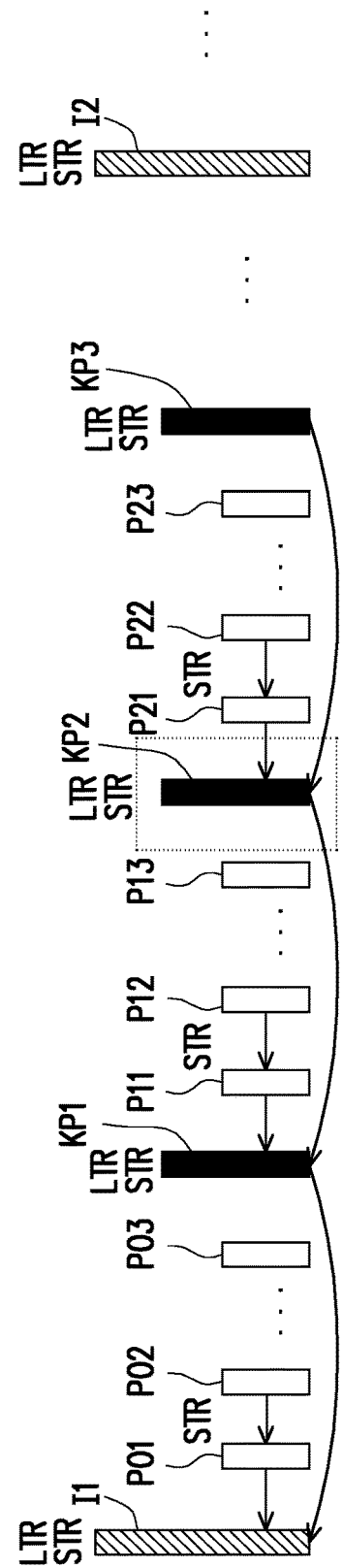
FIG. 4 is a schematic diagram illustrating different video frames according to another embodiment of the invention.

FIG. 4 is a schematic diagram illustrating different video frames according to another embodiment of the invention. In the embodiment illustrated in FIG. 4, the horizontal axis represents the time, and the vertical axis represents a bit rate (or data amount). The frame I1, the frame P01, the frame P02, the frame P03, the frame KP1, the frame P11, the frame P12, the frame P13, the frame KP2, the frame P21, the frame P22, the frame P23, the frame KP3 and the frame I2 illustrated in FIG. 4 may be inferred with reference to the description related to FIG. 3 and thus, will not be repeated. Being different from the embodiment illustrated in FIG. 3, each of the frame KP1, the frame KP2 and the frame KP3 illustrated in FIG. 4 are further set to a LTR frame, so as to serve as a reference frame of a subsequent KP frame. For instance, the frame KP1 set to the LTR frame may serve as the reference frame of the frame KP2, and the frame KP2 set to the LTR frame may serve as the reference frame of the frame KP3.

Thus, to randomly access the frame KP2 illustrated in FIG. 4, the closest I frame (i.e., the frame I1) is first decoded, then the frame KP1 is decoded (because the reference frame I1 is required), and finally, the frame KP2 is allowed to be decoded (because the reference frame KP1 is required). A playback latency (decoding latency) of the frame KP2 illustrated in FIG. 4 is a time for decoding three frames. By comparing FIG. 3 and FIG. 4, the playback latency of the frame KP2 illustrated in FIG. 3 is less than the playback latency of the frame KP2 illustrated in FIG. 4. However, the distance between the frame KP2 and its reference frame (i.e., the frame KP1) is short (in comparison with the frame KP2 illustrated in FIG. 3). As the distance between two frames is reduced, it usually indicates that a similarity between the two frames is increased. As the similarity is increased, a bit rate resulted from the similarity is reduced (i.e., a compression rate is more preferable).

According to the comparison between FIG. 3 and FIG. 4, the playback latency and the bit rate are in a trade-off relationship. In the conventional technique, the settings of the LTR frame and the STR frame are static (even fixed). The conventional technique is incapable of dynamically setting different frames to LTR frames and/or STR frames based on system usage requirements. Accordingly, the conventional technique cannot achieve optimization of encoding efficiency.

The embodiments of the invention provide a parameter automatically setting method capable of dynamically selecting the LTR frames and/or the STR frames. Based on system usage requirements, the embodiments of the invention may achieve dynamically setting different frames to the LTR frames and/or the STR frames. Accordingly, the embodiments of the invention achieve optimization of encoding efficiency. For instance, in the embodiments of the invention, selection of the LTR frames and/or the STR frames may be controlled by means of setting an acceptable playback latency control condition and an acceptable inter-frame correlation condition. By using the technique of the embodiments of the invention, any frame may be ensured to be completely decoded within an acceptable playback latency, and restrictions with respect to inter-frame correlation have been already considered in the selection of the LTR frames and/or the STR frames. Thus, the embodiment of the invention can achieve balance (optimization) between the encoding efficiency and the playback latency.

The playback latency control condition and the inter-frame correlation condition may be determined based on design requirements. In some embodiments, the playback latency control condition includes contents set forth as follows. The control circuit 110, in step S210, may forecast a playback latency of the current frame in the video decoding operation. For instance, to randomly access the frame KP1 illustrated in FIG. 4, a playback latency of the frame KP1 illustrated in FIG. 4 is "2" (which represents a time required for decoding 2 frames), and to randomly access the frame KP2 illustrated in FIG. 4, a playback latency of the frame KP2 illustrated in FIG. 4 is "3" (which represents a time required for decoding 3 frames). When the playback latency is less than a latency threshold, the playback latency control condition is satisfied. The latency threshold may be determined based on design requirements. When the playback latency is not less than the latency threshold, the playback latency control condition is not satisfied.

In some embodiments, the inter-frame correlation condition includes contents set forth as follows. The control circuit 110, in step S210, may estimate a similarity between the current frame and the reference frame. The similarity may be existing information generated during the process of the video encoding circuit 120 performing the video encoding operation, or other information capable of sufficiently showing whether the current frame and the reference frame are similar to each other. For instance, in some embodiments, the similarity may be a sum of absolute difference (SAD) between the current frame and its reference frame. The detail related to the calculation of the SAD is conventional and thus, will not be repeated. In some other embodiments, the similarity may be a total rate-distortion cost (RD cost) for the encoding of the current frame. The detail related to the calculation of the total RD cost is conventional and thus, will not be repeated. In yet other embodiments, the similarity may be a total bit-stream size of the encoded current frame. Generally, when the current frame is similar to its reference frame, a total bit-stream size (or a bit rate) of the current frame after being encoded is small. Otherwise, when the current frame is not similar to its reference frame, the total bit-stream size (or the bit rate) of the encoded current frame is large. Thus, the total bit-stream size of the encoded current frame may also be used to represent the similarity between the current frame and the reference frame.

When the similarity between the current frame and the reference frame is less than a similarity threshold, the inter-frame correlation condition is satisfied. The similarity threshold may be determined based on design requirements. When the similarity between the current frame and the reference frame is not less than the similarity threshold, the inter-frame correlation condition is not satisfied.

Figure 5:
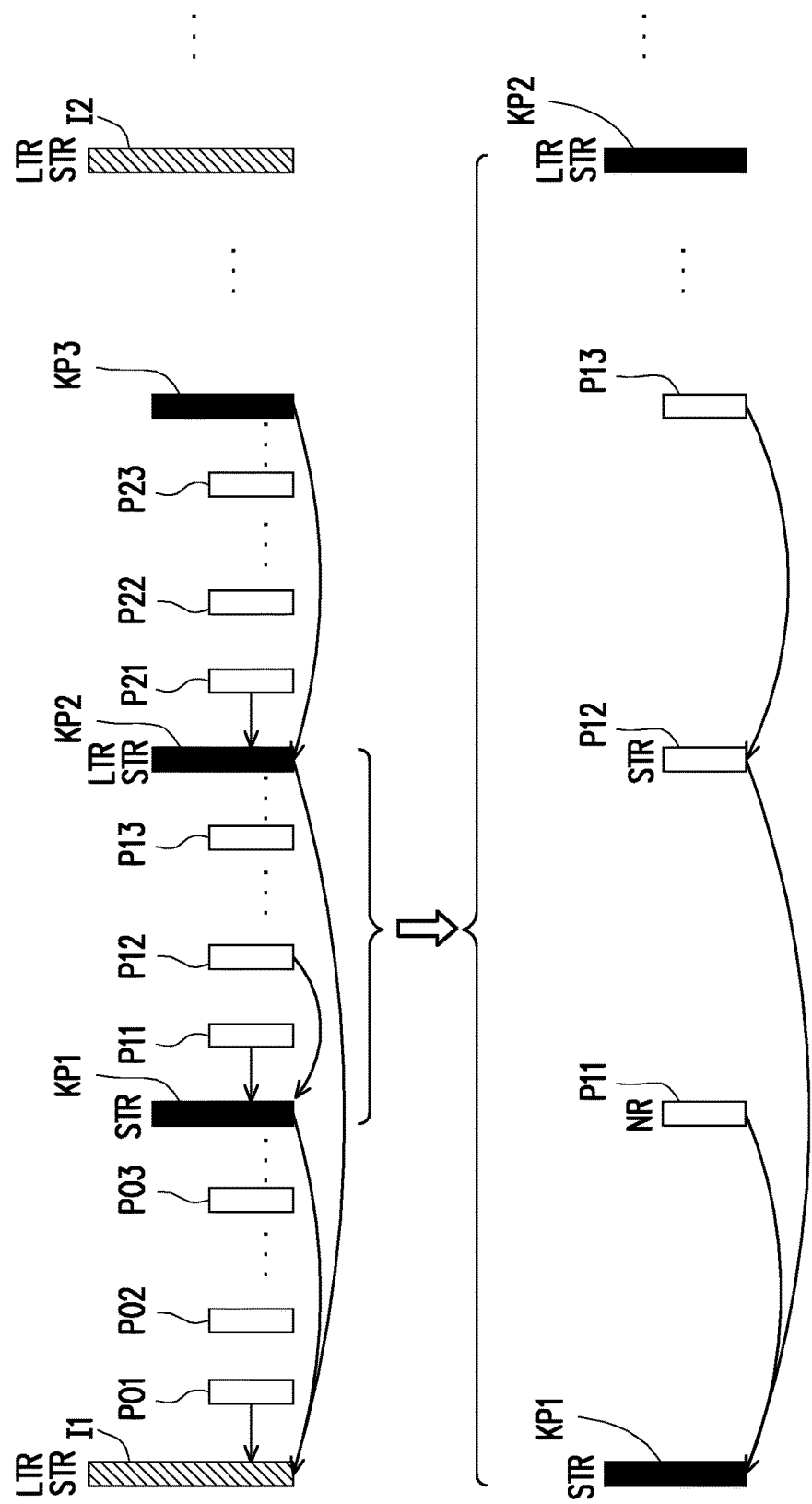
FIG. 5 is a schematic diagram illustrating different video frames according to yet another embodiment of the invention.

FIG. 5 is a schematic diagram illustrating different video frames according to yet another embodiment of the invention. In the embodiment illustrated in FIG. 5, the horizontal axis represents the time, and the vertical axis represents a bit rate (or data amount). The frame I1, the frame P01, the frame P02, the frame P03, the frame KP1, the frame P11, the frame P12, the frame P13, the frame KP2, the frame P21, the frame P22, the frame P23, the frame KP3 and the frame I2 illustrated in FIG. 5 may be inferred with reference to the description related to FIG. 3 or FIG. 4 and thus, will not be repeated. It should be noted that the settings of the LTR frames and the STR frames in the embodiments illustrated in FIG. 3 and FIG. 4 are static (even fixed). Different frames are incapable of being set to the LTR frames and/or the STR frames based on system usage requirements (or design requirements) in the embodiments illustrated in FIG. 3 and FIG. 4. Thus, the embodiments illustrated in FIG. 3 and FIG. 4 cannot achieve optimization of encoding efficiency. In the embodiment illustrated in FIG. 5, the control circuit 110 may dynamically set the current frame to a LTR and/or a STR according to the playback latency control condition and/or the inter-frame correlation condition.

Because the frame I1 illustrated in FIG. 5 is set to the STR frame, the frame I1 may serve as the reference frame of the frame P01, the frame P02 and/or the frame P03. Because the frame I1 illustrated in FIG. 5 is set to the LTR frame, the frame I1 may serve as reference frame of the frame KP1, the frame KP2 and/or the frame KP3. For descriptive convenience, it is assumed that the current frame is the frame KP1 illustrated in FIG. 5, and assumed that a similarity between the frame KP1 (i.e., the current frame) and its reference frame (i.e., the frame I1) it greater than the similarity threshold (i.e., the inter-frame correlation condition is not satisfied). Because the inter-frame correlation condition corresponding to the frame KP1 is not satisfied, the control circuit 110, in step S210, does not set the frame KP1 (i.e., the current frame) to the LTR frame. The control circuit 110 may set the frame KP1 (i.e., the current frame) to the STR frame. Because the frame KP1 is not the LTR frame, a reference frame of the frame KP2 illustrated in FIG. 5 is not the frame KP1. Accordingly, the reference frame of the frame KP2 illustrated in FIG. 5 is the closest LTR frame, i.e., the reference frame of the frame KP2 illustrated in FIG. 5 is the frame I1.

It is assumed that the current frame is the frame KP2 illustrated in FIG. 5, and assumed that a similarity between the frame KP2 (i.e., the current frame) and its reference frame (i.e., the frame I1) is less than the similarity threshold (i.e., the inter-frame correlation condition is satisfied). To randomly access the frame KP2 illustrated in FIG. 5, a playback latency of the frame I1 is "0" (because no other frames have to be referred to when the I frame is decoded), the playback latency of the frame KP1 is "1" (which represents a time for decoding 1 frame), and a playback latency of the frame KP2 is also "1". It is assumed that the latency threshold is "1". Because the playback latency of the reference frame (i.e., the frame I1) of the frame KP2 is less than the latency threshold, the playback latency control condition corresponding to the frame KP2 is satisfied. When both the playback latency control condition and the inter-frame correlation condition corresponding to the frame KP2 are satisfied, the control circuit 110 sets the frame KP2 (i.e., the current frame) to the LTR frame, so as to serve as the reference frame of the frame KP3. In addition, the control circuit 110 may further set the frame KP2 to the STR frame, so as to serve as the reference frame of the frame P21, the frame P22 and/or the frame P23.

The operation detail related to the P frames will be described hereinafter. Referring to the lower part in FIG. 5, because the frame KP1 illustrated in FIG. 5 is set to the STR frame, the frame KP1 may serve as the reference frame of the frame P11, the frame P12 and/or the frame P13. For descriptive convenience, it is assumed that the current frame is the frame P11 illustrated in FIG. 5, and assumed that a similarity between the frame P11 (i.e., the current frame) and its reference frame (i.e., the frame KP1) is greater than the similarity threshold (i.e., the inter-frame correlation condition is not satisfied). Because the inter-frame correlation condition corresponding to the frame P11 is not satisfied, the control circuit 110, in step S210, may set the frame P11 (i.e., the current frame) to a NR frame. Because the frame P11 is not a STR frame, the reference frame of the frame P12 illustrated in FIG. 5 is not the frame P11. Accordingly, the reference frame of the frame P12 illustrated in FIG. 5 it the closest STR frame, i.e., the reference frame of the frame P12 illustrated in FIG. 5 is the frame KP1.

It is assumed that the current frame is the frame P12 illustrated in FIG. 5, and assumed that a similarity between the frame P12 (i.e., the current frame) and its reference frame (i.e., the frame KP1) is less than the similarity threshold (i.e., the inter-frame correlation condition is satisfied). To randomly access the frame P12 illustrated in FIG. 5, the playback latency of the frame KP1 is "1" (which represents the time for decoding 1 frame), and the playback latency of the frame P12 is "2". It is assumed that the latency threshold is "2". Because the playback latency of the reference frame (i.e., the frame KP1) of the frame P12 is less than latency threshold, the playback latency control condition corresponding to the frame P12 is satisfied. When both the playback latency control condition and the inter-frame correlation condition corresponding to the frame P12 are satisfied, the control circuit 110 may set the frame P12 (i.e., the current frame) to a STR frame, so as to serve as a reference frame of the frame P13.

The control circuit 110 and/or the video encoding circuit 120 may be implemented through logic circuits (in a hardware form) formed on an integrated circuit) or implemented through software executed by a central processing unit (CPU). In the later scenario, related functions of the control circuit 110 and/or the video encoding circuit 120 may be implemented as programming codes of software (i.e., programs). The software (i.e., the programs) may be read by a computer (or a CPU) and may be recorded/stored in a read only memory (ROM), a storage device (which is referred to as a "recording medium") and/or a random access memory (RAM). Meanwhile, the programs are read from the recording medium through the computer (or the CPU) and executed, thereby achieve the related function. To serve as the recording medium, a "non-transitory computer readable medium", for example, a tape, a disk, a card, a semiconductor memory, a programmable logic circuit and so on, may be used. Further, the programs may also be provided to the computer (or the CPU) through any kind of transmission medium (e.g., a communication network or radio waves). The communication network may be, for example, Internet, wired communication, wireless communication or other communication media.

In different application scenarios, the related functions of the control circuit 110 and/or the video encoding circuit 120 may be implemented in a form of software, firmware or hardware by employing general programming languages (e.g., C or C++), hardware description languages (e.g., Verilog HDL or VHDL) or other suitable programming languages. In the hardware implementation, one or a plurality of controllers, micro-controllers, micro-processors, application-specific integrated circuits (ASICs), digital signal processors (DSPs), field programmable gate arrays (FPGAs) and/or other various logic blocks, modules and circuits in a processing unit can be employed to implement or execute the functions described herein. Moreover, the apparatus and the method of the invention can implemented by a combination of hardware, firmware and/or software.

In light of the foregoing, during the process of the video encoding operation, the video encoding apparatus and the video encoding method provided by the embodiments of the invention can achieve dynamically setting the current frame to the LTR frame, the STR frame and/or the NR frame according to the playback latency control condition and/or inter-frame correlation condition. Thus, the video encoding apparatus and the video encoding method provided by the embodiments of the invention can further achieve optimization of encoding efficiency.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A video encoding apparatus, comprising:
    a video encoding circuit, performing a video encoding operation on a video stream to generate an encoded stream; and
    a control circuit, controlling the video encoding circuit to perform the video encoding operation, and dynamically setting a current frame in the video stream to at least one of a long-term reference frame, a short-term reference frame and a non-reference frame according to at least one of a playback latency control condition and an inter-frame correlation condition, wherein the long-term reference frame and the short-term reference frame are used as a decoding reference frame in a video decoding operation, wherein the playback latency control condition comprises:
    forecasting a playback latency of a reference frame of the current frame in the video decoding operation, wherein the playback latency represents a time for decoding the reference frame of the current frame;
    determining the playback latency control condition as being satisfied when the playback latency is less than a latency threshold; and
    determining the playback latency control condition as being not satisfied when the playback latency is not less than the latency threshold.

2. The video encoding apparatus according to claim 1, wherein the inter-frame correlation condition comprises:
  estimating a similarity between the current frame and the reference frame;
  determining the inter-frame correlation condition as being satisfied when the similarity is less than a similarity threshold; and
  determining the inter-frame correlation condition as being not satisfied when the similarity is not less than the similarity threshold.

3. The video encoding apparatus according to claim 2, wherein the similarity is a sum of absolute difference between the current frame and the reference frame.

4. The video encoding apparatus according to claim 2, wherein the similarity is a total rate-distortion cost for encoding of the current frame.

5. The video encoding apparatus according to claim 2, wherein the similarity is a total bit-stream size of the current frame after being encoded.

6. The video encoding apparatus according to claim 1, wherein the current frame is a key P frame, and the control circuit sets the current frame to the long-term reference frame when both the playback latency control condition and the inter-frame correlation condition are satisfied or otherwise, does not set the current frame to the long-term reference frame.

7. The video encoding apparatus according to claim 1, wherein the current frame is a P frame, and the control circuit sets the current frame to the short-term reference frame when both the playback latency control condition and the inter-frame correlation condition are satisfied or otherwise, sets the current frame to the non-reference frame.

8. A video encoding method, comprising:
  performing, by a video encoding circuit, a video encoding operation on a video stream to generate an encoded stream;
  controlling, by a control circuit, the video encoding circuit to perform the video encoding operation; and
  dynamically setting, by the control circuit, a current frame in the video stream to at least one of a long-term reference frame, a short-term reference frame and a non-reference frame according to at least one of a playback latency control condition and an inter-frame correlation condition, wherein the long-term reference frame and the short-term reference frame are used as a decoding reference frame in a video decoding operation, wherein the playback latency control condition comprises:
  forecasting a playback latency of a reference frame of the current frame in the video decoding operation, wherein the playback latency represents a time for decoding the reference frame of the current frame;
  determining the playback latency control condition as being satisfied when the playback latency is less than a latency threshold; and
  determining the playback latency control condition as being not satisfied when the playback latency is not less than the latency threshold.

9. The video encoding method according to claim 8, wherein the inter-frame correlation condition comprises:
  estimating a similarity between the current frame and the reference frame;
  determining the inter-frame correlation condition as being satisfied when the similarity is less than a similarity threshold; and
  determining the inter-frame correlation condition as being not satisfied when the similarity is not less than the similarity threshold.

10. The video encoding method according to claim 9, wherein the similarity is a sum of absolute difference between the current frame and the reference frame.

11. The video encoding method according to claim 9, wherein the similarity is a total rate-distortion cost for encoding of the current frame.

12. The video encoding method according to claim 9, wherein the similarity is a total bit-stream size of the current frame after being encoded.

13. The video encoding method according to claim 8, wherein the current frame is a key P frame, and the step of setting the current frame to the at least one of the long-term reference frame, the short-term reference frame and the non-reference frame comprises:
  setting, by the control circuit, the current frame to the long-term reference frame when both the playback latency control condition and the inter-frame correlation condition are satisfied or otherwise, not setting the current frame to the long-term reference frame.

14. The video encoding method according to claim 8, wherein the current frame is a P frame, and the step of setting the current frame to the at least one of the long-term reference frame, the short-term reference frame and the non-reference frame comprises:
  setting, by the control circuit, the current frame to the short-term reference frame when both the playback latency control condition and the inter-frame correlation condition are satisfied or otherwise, setting the current frame to the non-reference frame.

* * * * *